(12) United States Patent
Zhou et al.

(10) Patent No.: US 11,828,655 B2
(45) Date of Patent: Nov. 28, 2023

(54) METHOD AND SYSTEM OF TWO-POINT CORRECTION BASED ON TEMPERATURE SUBSTITUTION

(71) Applicant: University of Electronic Science and Technology of China, Chengdu (CN)

(72) Inventors: Yun Zhou, Chengdu (CN); Jian Lv, Chengdu (CN); Longcheng Que, Chengdu (CN); Kang He, Chengdu (CN); Guanyu Mi, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 287 days.

(21) Appl. No.: 17/345,331

(22) Filed: Jun. 11, 2021

(65) Prior Publication Data

US 2022/0187131 A1    Jun. 16, 2022

(30) Foreign Application Priority Data

Dec. 16, 2020   (CN) .......................... 202011483132.6

(51) Int. Cl.
*G01J 5/00*       (2022.01)
*G06T 7/80*       (2017.01)
(Continued)

(52) U.S. Cl.
CPC .............. *G01J 5/00* (2013.01); *G06T 7/0002* (2013.01); *G06T 7/80* (2017.01); *G06T 7/90* (2017.01);
(Continued)

(58) Field of Classification Search
CPC ........ G01J 5/00; G01J 5/80; G01J 5/53; G01J 2005/0077; G01J 5/485; G06T 7/0002;
(Continued)

(56) References Cited

U.S. PATENT DOCUMENTS 9,442,020 B2 *   9/2016   Durand ..................... G01J 5/22
2001/0040216 A1 *  11/2001   Knauth ..................... G01J 5/20
348/E5.081

OTHER PUBLICATIONS

Cao, Yangpeng ("Solid state temperature-dependent NUC (non-uniformity correction) in uncooled LWIR (long-wave infrared) imaging system") Proc. SPIE 8704, Infrared Technology and Applications (Year: 2013).*
(Continued)

*Primary Examiner* — Molly Wilburn
(74) *Attorney, Agent, or Firm* — Nitin Kaushik (57) ABSTRACT

A method and system of two-point correction based on temperature substitution, includes: a black body related to the lens temperature is arranged outside a lens, a first black body arranged in front of the lens of an infrared thermal camera, so as to collect a gray value of the first black body; a temperature of the first black body being equal to the lens temperature; a second black body arranged in front of the lens of the infrared thermal camera, so as to collect a gray value of the second black body; a temperature of the second black body being higher than the lens temperature. Two correction parameters obtained by black body calculation related to temperature are strongly applicable, which eliminates the problem of image quality deterioration caused by temperature changes and greatly eliminates the pot lid phenomenon due to non-uniformity, thereby accurately calculating the corrected gray value.

8 Claims, 5 Drawing Sheets

(51) Int. Cl.
  *G06T 7/90* (2017.01)
  *G06T 7/00* (2017.01)
  *G01J 5/80* (2022.01)

(52) U.S. Cl.
  CPC ....... *G01J 5/80* (2022.01); *G06T 2207/10048* (2013.01); *G06T 2207/30168* (2013.01)

(58) Field of Classification Search
  CPC ... G06T 7/80; G06T 7/90; G06T 2207/10048; G06T 2207/30168; G06T 5/009
  See application file for complete search history.

(56) References Cited

OTHER PUBLICATIONS

Huawei, Wang ("An Adaptive Two-point Non-uniformity Correction Algorithm Based on Shutter and Its Implementation") Fifth Conference on Measuring Technology and Mechatronics Automation. (Year: 2013).*

* cited by examiner

METHOD AND SYSTEM OF TWO-POINT CORRECTION BASED ON TEMPERATURE SUBSTITUTION

TECHNICAL FIELD

The present disclosure relates to the field of infrared image processing technology, and in particular, to a method and a system of two-point correction based on temperature substitution.

BACKGROUND

Infrared thermal imaging uses the photoelectric technology to detect infrared-specific band signals of thermal radiation from objects, converts the signals into images and graphics that are distinguishable to human vision and may be used for further calculations for temperature values. The infrared thermal imaging technology enables human beings to transcend vision disturbances, so that human beings can see the temperature distribution on surfaces of objects.

If the surface temperature of an object exceeds absolute zero, electromagnetic waves will be radiated. The radiation intensity and wavelength distribution characteristics of electromagnetic waves will change along with a change in temperature. Electromagnetic waves with wavelengths between 0.75 μm and 1000 μm are referred to as "infrared rays", while the "visible light" visible to human vision is between 0.4 μm and 0.75 μm.

The wavelength of 0.78~2.0 μm is referred to as near infrared, and the wavelength of 2.0~1000 μm is referred to as thermal infrared. Infrared rays, when transmitted on the earth's surface, will be absorbed by atmospheric components (especially $H_2O$, $CO_2$, $CH_4$, $N_2O$, $O_3$, etc.) and substantially decrease in intensity. They are only good at transmission in the two bands of short waves of 3 μm~5 μm and long waves of 8~12 μm, which are commonly referred to as the Atmospheric Window. Most infrared thermal cameras perform detection in these two bands to calculate and display the temperature distribution on an object's surface. In addition, since infrared rays are extremely weak in penetration of most solid and liquid substances, infrared thermal imaging detection mainly focuses on measurement of the infrared radiation energy on the object surface.

Raw infrared images are generally problematic, such as great non-uniformity, low contrast and poor resolution, which greatly reduce the imaging quality of infrared imaging systems in practical application. Non-uniformity refers to that when a focal plane array is illuminated under the uniform external light intensity, each cell has different output, which appears as spatial noises or fixed pattern noises in the image. Infrared image non-uniformity correction based on two points is a calibration-based correction algorithm, and the two-point correction method is one of the earliest and most mature algorithms. There are two preconditions for applying the two-point correction method. Firstly, the response of a detector changes linearly in the concerned temperature range. Secondly, the response of the detector has time stability and is less susceptible to random noises, so that a multiplicative and additive noise of a fixed mode is introduced into non-uniformity correction based on calibration, it is usually required to obtain calibration coefficients required for correction in advance, and then to read and correspondingly process the coefficients during the implementation of calibration, but not capable of adaptively tracking the drift of detection element response characteristics. When the drift is huge, recalibration is necessary for updating correction coefficients, and two-point parameters are usually updated by baffle correction. However, non-uniformity correction in the prior art has a problem that the sole use of baffle data may easily lead to the image quality deterioration due to the temperature change.

SUMMARY

The present disclosure aims at providing a method and a system of two-point correction based on temperature substitution, which may mitigate the image quality deterioration easily caused by the temperature change, broaden the application of the machine core system, and improve the image quality.

In order to achieve the above purpose, the present disclosure provides the following scheme:

A method of two-point correction based on temperature substitution, including:

A lens temperature is acquired for an infrared thermal camera in the thermal equilibrium state;

A gray value is acquired for a first black body arranged in front of the lens of the infrared thermal camera; a temperature of the first black body is equal to the lens temperature;

A gray value is acquired for a baffle; the baffle is arranged between the lens of the infrared thermal camera and a detector of the infrared thermal camera;

The gray value of the first black body is corrected according to a first two-point correction parameter to obtain a corrected first uniform gray value; the gray value of the baffle is corrected according to the first two-point correction parameter to obtain a corrected second uniform gray value;

A first correction parameter is acquired according to the gray value of the first black body, the first uniform gray value, the gray value of the baffle and the second uniform gray value;

A gray value is acquired for a second black body arranged in front of the lens of the infrared thermal camera; a value by which a temperature of the second black body is higher than the lens temperature is a pre-set temperature value;

The gray value of the second black body is corrected according to a second two-point correction parameter to obtain a corrected third uniform gray value;

A second correction parameter is acquired according to the gray value of the first black body, the first uniform gray value, the gray value of the second black body, and the third uniform gray value;

A gray value to be corrected is corrected according to the first correction parameter, the second correction parameter, the first uniform gray value and the second uniform gray value to obtain a corrected gray value.

Preferably, before obtaining the lens temperature of the infrared thermal camera in the thermal equilibrium state, the method further includes:

The core of the infrared thermal camera is heated for a pre-set time period, so that the infrared thermal camera is in the thermal equilibrium state.

Preferably, the gray value of the first black body is corrected according to the first two-point correction parameter to obtain a corrected first uniform gray value; and the gray value of the baffle is corrected to obtain a corrected second uniform gray value; which is specifically expressed as:

$$\begin{cases} Y_{X1} = a_1 \cdot X_1 + b_1 \\ Y_B = a_1 \cdot B + b_1 \end{cases}$$

Wherein, $X_1$ is the gray value of the first black body, B is the gray value of the baffle, $Y_{X1}$ is the first uniform gray value, $Y_B$ is the second uniform gray value, $a_1$ is the first correction parameter, and $b_1$ is the first correction parameter quantity.

Preferably, the first correction parameter is acquired according to the gray value of the first black body, the first uniform gray value, the gray value of the baffle and the second uniform gray value; which is specifically expressed as:

$$a_1=(Y_B-Y_{X1})/(B-X_1)$$

Wherein, $a_1$ is the first correction parameter, $X_1$ is the gray value of the first black body, B is the gray value of the baffle, $Y_{X1}$ is the first uniform gray value, $Y_B$ is the second uniform gray value.

Preferably, the gray value of the second black body is corrected according to the second two-point correction parameter to obtain the corrected third uniform gray value; which is specifically expressed as:

$$Y_{X2}=a_2 \cdot X_2+b_2$$

Wherein, $a_2$ is the second correction parameter, $X_2$ is the gray value of the second black body, $Y_{X2}$ is the third uniform gray value, and $b_2$ is the second correction parameter quantity.

Preferably, the second correction parameter is acquired according to the gray value of the first black body, the first uniform gray value, the gray value of the second black body, and the third uniform gray value, which is specifically expressed as:

$$a_2=(Y_{X2}-Y_{X1})/(X_2-X_1)$$

Wherein, $a_2$ is the second correction parameter, $Y_{X1}$ is the first uniform gray value, $X_1$ is the gray value of the first black body, $X_2$ is the gray value of the second black body, and $Y_{X2}$ is the third uniform gray value.

Preferably, the gray value to be corrected is corrected according to the first correction parameter, the second correction parameter, the first uniform gray value and the second uniform gray value to obtain the corrected gray value, which is specifically expressed as:

$$Y=a_2 \cdot (X-B+(Y_B-Y_{X1})/a_1)$$

Wherein, $Y_B-Y_{X1}$ is a difference value between the second uniform gray value and the first uniform gray value, $Y_{X1}$ is the first uniform gray value, $Y_B$ is the second uniform gray value, $a_1$ is the first correction parameter, $a_2$ is the second correction parameter, B is the gray parameter of the baffle, X is the gray value to be corrected, and Y is the corrected gray value.

Preferably, the calculation method of the difference value includes:

The current lens temperature and the current baffle temperature are obtained;

The difference value is calculated according to a formula $Y_B-Y_{X1}=F(T_J-T_B)$ by using a pre-stored fitting function, wherein $T_J$ is the current lens temperature, $T_B$ is the current baffle temperature, and F is the fitting function;

The fitting function is determined in the following way:

In the process of heating the infrared thermal camera, fitting data is collected for many times; the fitting data includes the gray value of the baffle, the gray value of the first black body, the lens temperature and the baffle temperature; and The fitting is performed according to a plurality of groups of fitting data to obtain a fitting function.

A system of two-point correction based on temperature substitution, including:

A temperature acquisition module, used for acquiring a lens temperature for an infrared thermal camera in the thermal equilibrium state;

A first collection module of gray value, used for acquiring a gray value of a first black body arranged in front of a lens of the infrared thermal camera; and a temperature of the first black body is equal to the lens temperature;

A second collection module of gray value, used for acquiring a gray value of a baffle; and the baffle is arranged between the lens of the infrared thermal camera and a detector of the infrared thermal camera;

A first correction module, used for correcting the gray value of the first black body according to a first two-point correction parameter to obtain a corrected first uniform gray value, and for correcting the gray value of the baffle according to the first two-point correction parameter to obtain a corrected second uniform gray value;

A first parameter collection module, used for acquiring a first correction parameter according to the gray value of the first black body, the first uniform gray value, the gray value of the baffle and the second uniform gray value;

A third gray value collection module, used for acquiring a gray value of a second black body arranged in front of the lens of the infrared thermal camera; and a value by which a temperature of the second black body is higher than the lens temperature is a pre-set temperature value;

A second correction module, used for correcting the gray value of the second black body according to a second two-point correction parameter to obtain a corrected third uniform gray value;

A second parameter collection module, used for acquiring a second correction parameter according to the gray value of the first black body, the first uniform gray value, the gray value of the second black body, and the third uniform gray value;

A calculation module, used for correcting a gray value to be corrected according to the first correction parameter, the second correction parameter, the first uniform gray value and the second uniform gray value to obtain a corrected gray value.

Preferably, the first correction module is specifically expressed as:

$$\begin{cases} Y_{X1}=a_1 \cdot X_1+b_1 \\ Y_B=a_1 \cdot B+b_1 \end{cases}$$

Wherein, $X_1$ is the gray value of the first black body, B is the gray value of the baffle, $Y_{X1}$ is the first uniform gray value, $Y_B$ is the second uniform gray value, $a_1$ is the first correction parameter, and $b_1$ is the first correction parameter quantity.

According to embodiments provided in the present disclosure, the present disclosure discloses the following technical effects:

The present disclosure provides a method and a system of two-point correction based on temperature substitution, including: a black body related to the lens temperature is arranged outside a lens, a first black body is arranged in front of the lens of an infrared thermal camera, so as to collect a gray value of the first black body; a temperature of the first black body is equal to the lens temperature; a second black body is arranged in front of the lens of the infrared thermal camera, so as to collect a gray value of the second black body; a temperature of the second black body is higher than the lens temperature. The two correction parameters obtained by black body calculation related to temperature are strongly applicable, which eliminate the problem of image quality deterioration caused by temperature change and greatly eliminate pot lid phenomenon due to non-uniformity, thereby accurately calculating the corrected gray value.

BRIEF DESCRIPTION OF THE DRAWINGS

In order to illustrate the embodiments of the present disclosure more clearly, the accompanying drawings related to the embodiments will be briefly introduced below. Apparently, the drawings in the following description are only some embodiments of the present disclosure, and those of ordinary skills in the art may obtain other drawings according to these drawings without creative work.

DETAILED DESCRIPTION

Technical schemes in the embodiments of the present disclosure will be described clearly and completely with reference to the accompanying drawings thereof. Apparently, the embodiments described herein are only part of, not all of, embodiments in the present disclosure. Based on the embodiments of the present disclosure, all other embodiments obtained by those of ordinary skills in the art without creative work belong to the scope claimed by the present disclosure.

The present disclosure aims at providing a method and a system of two-point correction based on temperature substitution, which may mitigate the image quality deterioration easily caused by the temperature change, broaden the application of the machine core system, and improve the image quality.

So that the above mentioned purposes, features and advantages of the present disclosure can be more apparently understood, the present disclosure will be further described with reference to figures and embodiments below.

Figure 1:
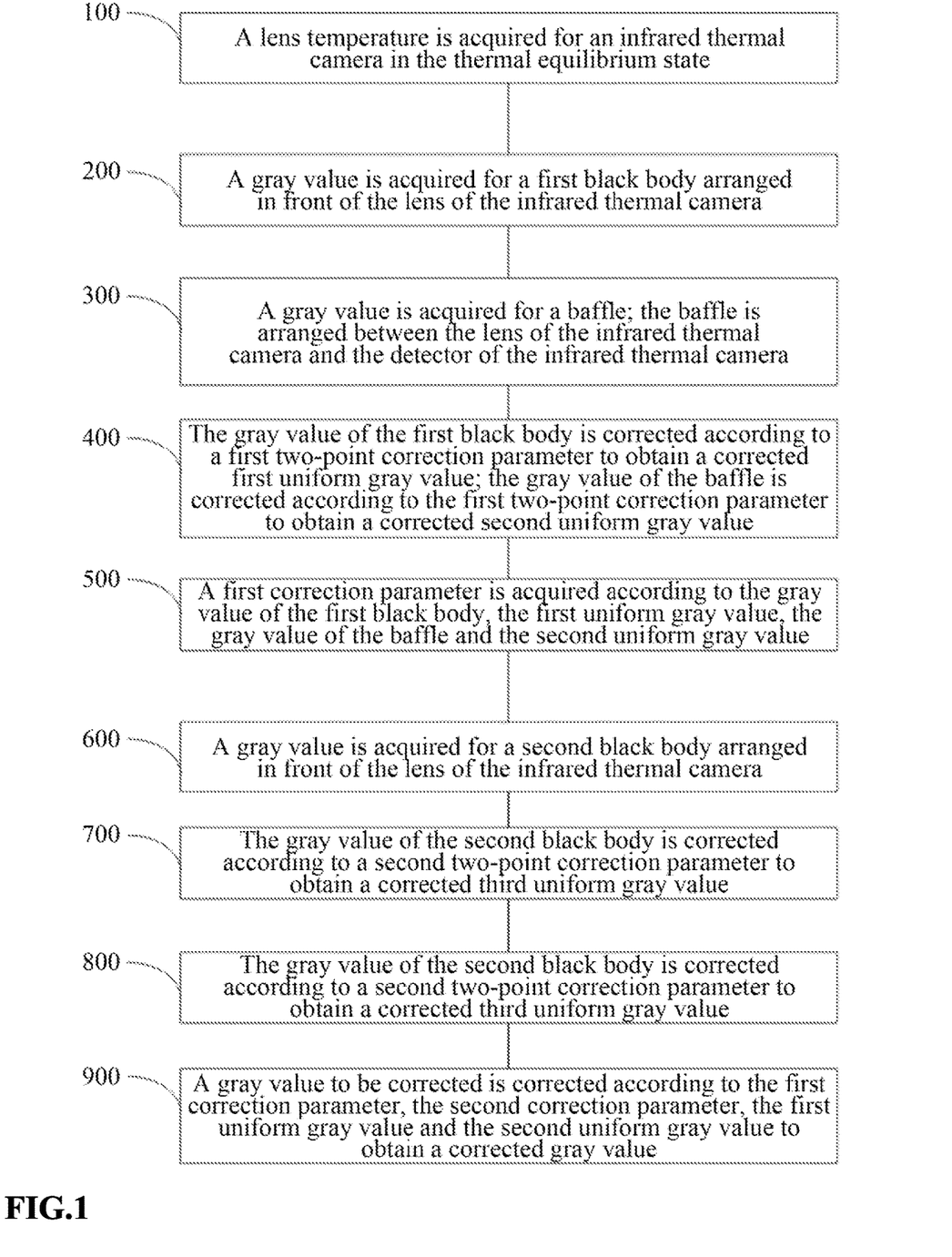
FIG. 1 is a flowchart of the method of two-point correction based on temperature substitution according to the present disclosure.

FIG. 1 is a flowchart of the method of two-point correction based on temperature substitution. As shown in FIG. 1, the method includes:

Step 100: A lens temperature is acquired for an infrared thermal camera in the thermal equilibrium state.

Step 200: A gray value is acquired for a first black body arranged in front of the lens of the infrared thermal camera.

Step 300: A gray value is acquired for a baffle arranged between the lens of the infrared thermal camera and a detector of the infrared thermal camera.

Step 400: The gray value of the first black body is corrected according to a first two-point correction parameter to obtain a corrected first uniform gray value; and the gray value of the baffle is corrected according to the first two-point correction parameter to obtain a corrected second uniform gray value.

Step 500: A first correction parameter is acquired according to the gray value of the first black body, the first uniform gray value, the gray value of the baffle and the second uniform gray value.

Step 600: A gray value is acquired for a second black body arranged in front of the lens of the infrared thermal camera; and a value by which a temperature of the second black body is higher than the lens temperature is a pre-set temperature value.

Step 700: The gray value of the second black body is corrected according to a second two-point correction parameter to obtain a corrected third uniform gray value.

Step 800: A second correction parameter is acquired according to the gray value of the first black body, the first uniform gray value, the gray value of the second black body, and the third uniform gray value.

Step 900: A gray value to be corrected is corrected according to the first correction parameter, the second correction parameter, the first uniform gray value and the second uniform gray value to obtain a corrected gray value.

Preferably, the method also includes the following step before Step 100:

The core of the infrared thermal camera is heated for a pre-set time period, so that the infrared thermal camera is in the thermal equilibrium state.

Specifically, in Step 100, the core of the infrared thermal camera to be processed is heated for more than 30 minutes to reach a thermal equilibrium.

As an optional implementation, in Step 200, the gray value is acquired for the first black body arranged in front of the lens of the infrared thermal camera; the temperature of the first black body is equal to the lens temperature, wherein the first black body may also be implemented by adjusting the lens to defocus the imaging state, and the gray value of the first blackbody is a gray value of the defocused lens, and the temperature of the first black body is the lens temperature.

Preferably, Step 400 is specified as follows:

$$\begin{cases} Y_{X1} = a_1 \cdot X_1 + b_1 \\ Y_B = a_1 \cdot B + b_1 \end{cases}$$

Wherein, $X_1$ is the gray value of the first black body, B is the gray value of the baffle, $Y_{X1}$ is the first uniform gray value, $Y_B$ is the second uniform gray value, $a_1$ is the first correction parameter, and $b_1$ is the first correction parameter quantity. $a_1$ and $b_1$ are the first two-point correction parameters, which are of the physical significance of being the two-point correction parameters for objects inside the lens, and applicable to the baffle and lens.

At the same time, specifically, $X_1$ is obtained for only once. However, values of $Y_B$–$Y_{X1}$ are obtained by collecting the lens temperature $T_J$ and the baffle temperature $T_B$ at the same time and through fitting. After $a_1$ is obtained, it remains its value unchanged and is used many times when calculating the value of $X_1$.

Preferably, Step 500 is specified as follows:

$$a_1 = (Y_B - Y_{X1})/(B - X_1)$$

Wherein, $a_1$ is the first correction parameter, $X_1$ is the gray value of the first black body, B is the gray value of the baffle, $Y_{X1}$ is the first uniform gray value, $Y_B$ is the second uniform gray value.

Figure 2:
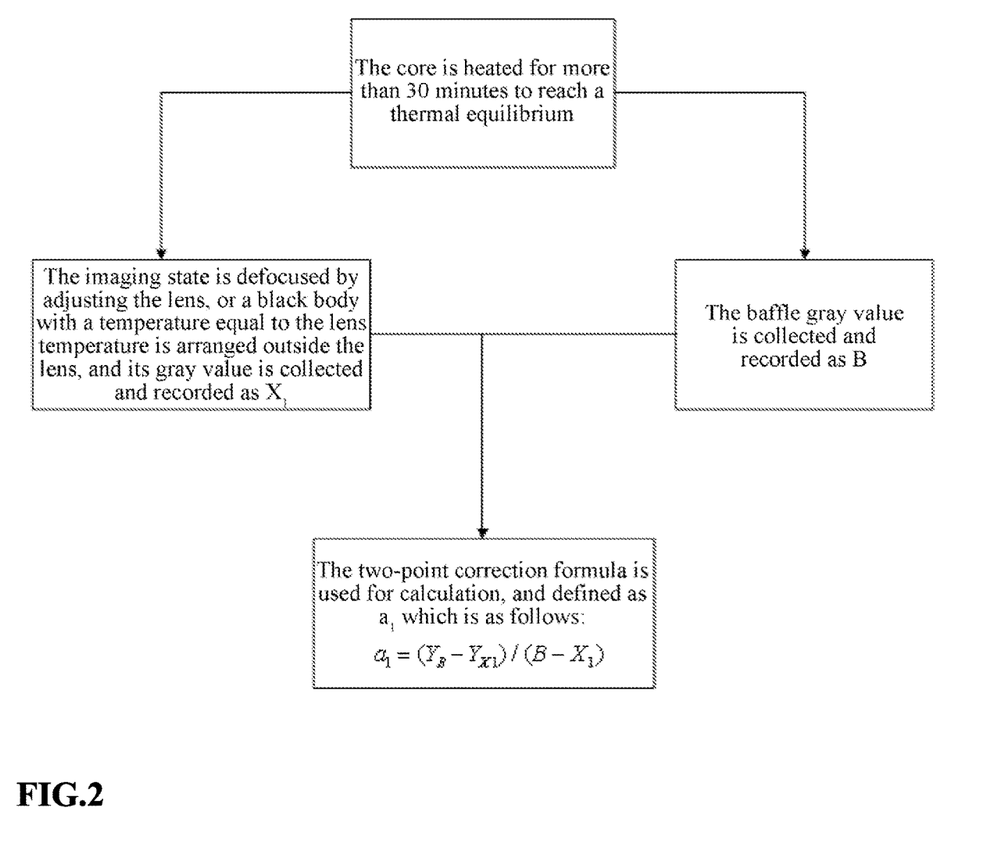
FIG. 2 is a flowchart of obtaining the first correction parameter in embodiments according to the present disclosure.

FIG. 2 is a flowchart of obtaining the first correction parameter in embodiments according to the present disclosure, and the first correction parameter is obtained specifically as shown in FIG. 2.

Optionally, the pre-set temperature value in Step 600 is an empirical value, which is generally 15-50° C. In this embodiment, this value is 20° C. Temperature required by different detectors may vary slightly within ±15° C. generally in the national standard.

Preferably, Step 700 is specified as follows:

$$Y_{X2}=a_2 \cdot X_2+b_2$$

Wherein, $a_2$ is the second correction parameter, $X_2$ is the gray value of the second black body, $Y_{X2}$ is the third uniform gray value, and $b_2$ is the second correction parameter quantity; and $a_2$ and $b_2$ are the second two-point correction parameters, which are of the physical significance of being the two-point correction parameters for objects inside the lens, and applicable to the baffle and lens.

Preferably, Step 800 is specified as follows:

$$a_2=(Y_{X2}-Y_{X1})/(X_2-X_1)$$

Wherein, $a_2$ is the second correction parameter, $Y_{X1}$ is the first uniform gray value, $X_1$ is the gray value of the first black body, $X_2$ is the gray value of the second black body, and $Y_{X2}$ is the third uniform gray value.

Figure 3:
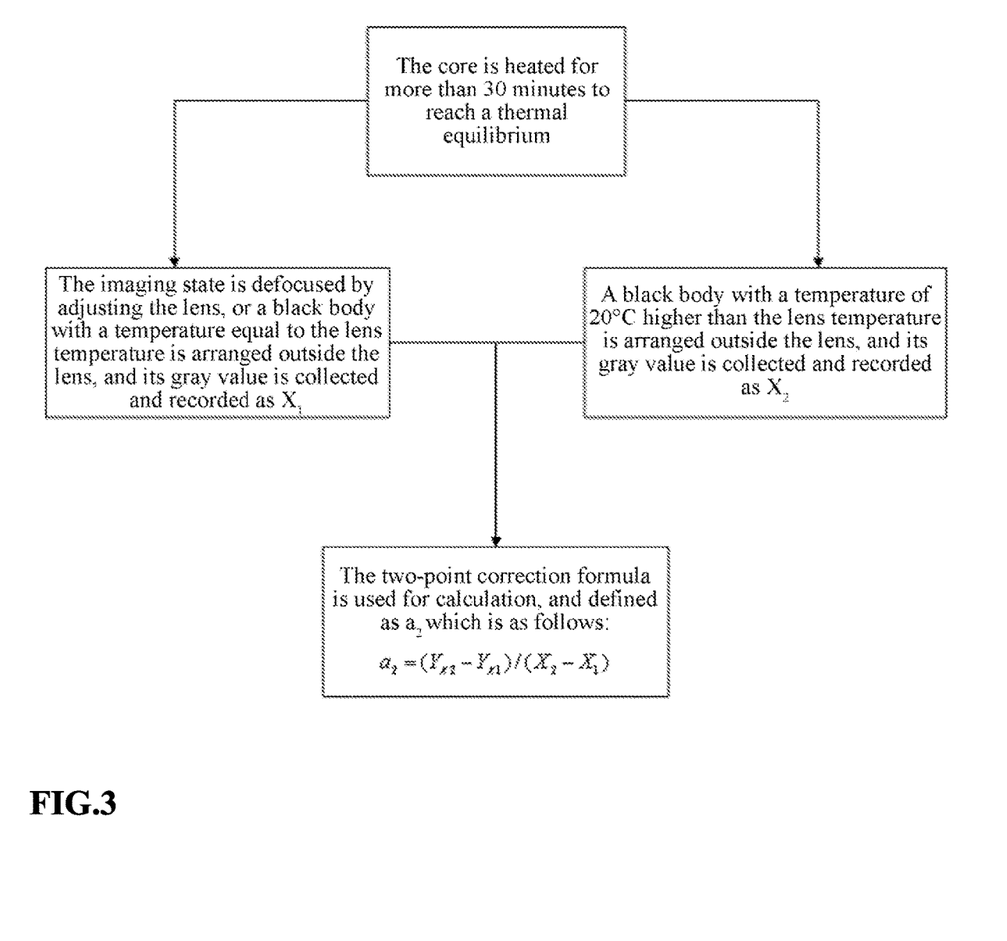
FIG. 3 is a flowchart of obtaining the second correction parameter in embodiments according to the present disclosure.

FIG. 3 is a flowchart of obtaining the second correction parameter in embodiments according to the present disclosure, and the second correction parameter is obtained specifically as shown in FIG. 3.

Specifically, in Step 800, a specific formula of the second correction parameter can be directly obtained by combining two formulas:

$$Y_{X1}=a_2 \cdot X_1+b_2;$$

$$Y_{X2}=a_2 \cdot X_2+b_2;$$

The specific formula $a_2=(Y_{X2}-Y_{X1})/(X_2-X_1)$ of the second correction parameter can be obtained by combining the above two formulas.

Preferably, Step 900 is specified as follows:

$$Y=a_2 \cdot (X-B+(Y_B-Y_{X1})/a_1)$$

Wherein, $Y_B-Y_{X1}$ is a difference value between the second uniform gray value and the first uniform gray value, $Y_{X1}$ is the first uniform gray value, $Y_B$ is the second uniform gray value, $a_1$ is the first correction parameter, $a_2$ is the second correction parameter, B is the gray parameter of the baffle, X is the gray value to be corrected, and Y is the corrected gray value that was to be corrected.

Preferably, the calculation method of the difference value includes:

The current lens temperature and the current baffle temperature are obtained;

The difference value is calculated according to a formula $Y_B-Y_{X1}=F(T_J-T_B)$ by using a pre-stored fitting function, wherein $T_J$ is the current lens temperature, $T_B$ is the current baffle temperature, and F is the fitting function;

The fitting function is determined in the following way:

In the process of heating the infrared thermal camera, fitting data is collected for many times; the fitting data includes the gray value of the baffle, the gray value of the first black body, the lens temperature and the baffle temperature; and The fitting is performed according to a plurality of groups of fitting data to obtain a fitting function.

Figure 4:
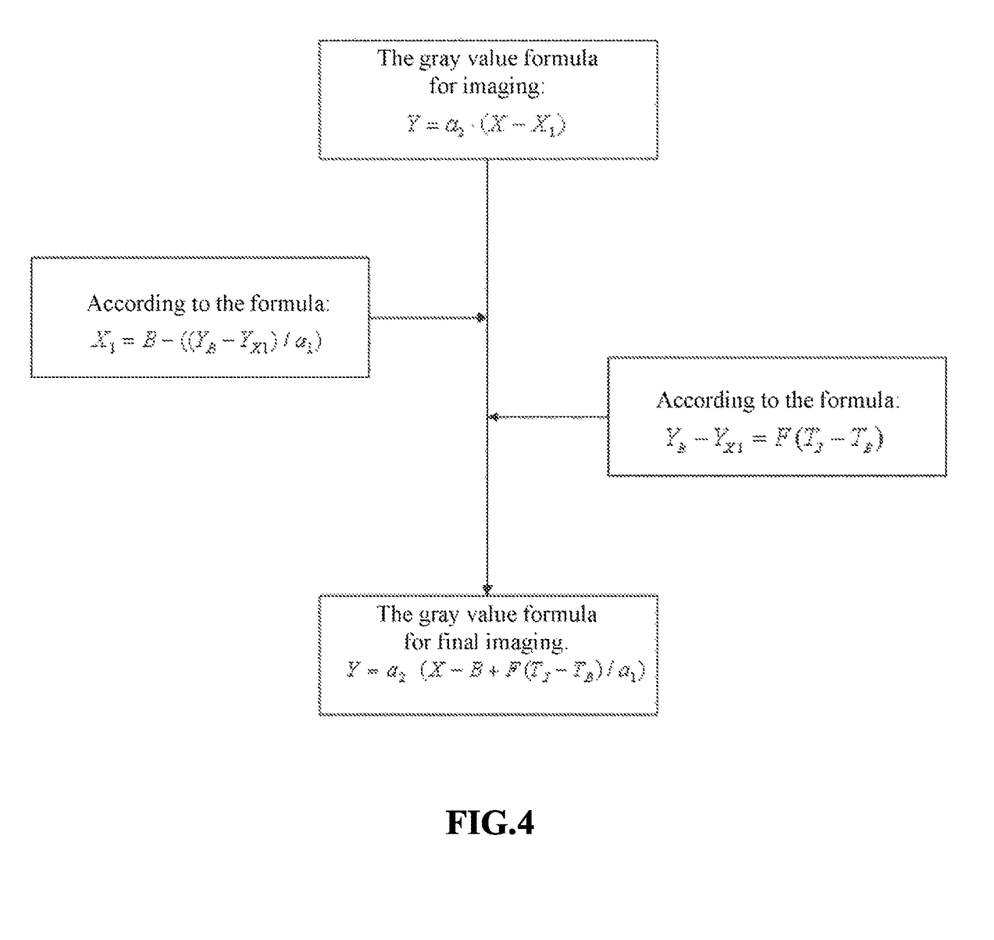
FIG. 4 is a flowchart of obtaining the correction formula in embodiments according to the present disclosure.

FIG. 4 is a flowchart of obtaining the correction formula in embodiments according to the present disclosure; as shown in FIG. 4, a final image non-uniformity correction formula is obtained as follows.

In Step 1: a gray value formula used for final imaging is:

$$Y=a_2 \cdot (X-X_1)$$

Wherein X is a gray value to be corrected which is a random external gray value; and Y is a corrected gray value.

In Step 2: according to the formula for obtaining the first correction parameter, it can be obtained that $$X_1=B-((Y_B-Y_{X1})/a_1)$$

Wherein $Y_B-Y_{X1}$ is a uniform matrix which is related to the difference between the baffle temperature and the lens temperature. By heating the machine core from cold to hot, the baffle gray value and black body gray value at the same temperature as the lens are collected for many times, while the lens temperature $T_J$ and the baffle temperature $T_B$ are collected at the same time, is obtained by fitting.

In Step 3: according to the calculation formulas for obtaining the second and first correction parameters, respectively, we may obtain Y:

$$Y=a_2 \cdot (X-B+(Y_B-Y_{X1})/a_1))$$

The Step 3 includes the following specific steps:

$$Y_B-Y_{X1}=F(T_J-T_B)$$

F is a fitting function. As a result, a final formula obtained is as follows:

$$Y=a_2 \cdot (X-B+F(T_J-T_B)/a_1)$$

Among the formulas mentioned above, $a_1$ is solved by the calculation formula for obtaining the first correction parameter and may be used repeatedly. $Y_B-Y_{X1}$ Real-time data is obtained by fitting, and B is obtained by hitting the baffle. So we get a desirable $X_1$.

Figure 5:
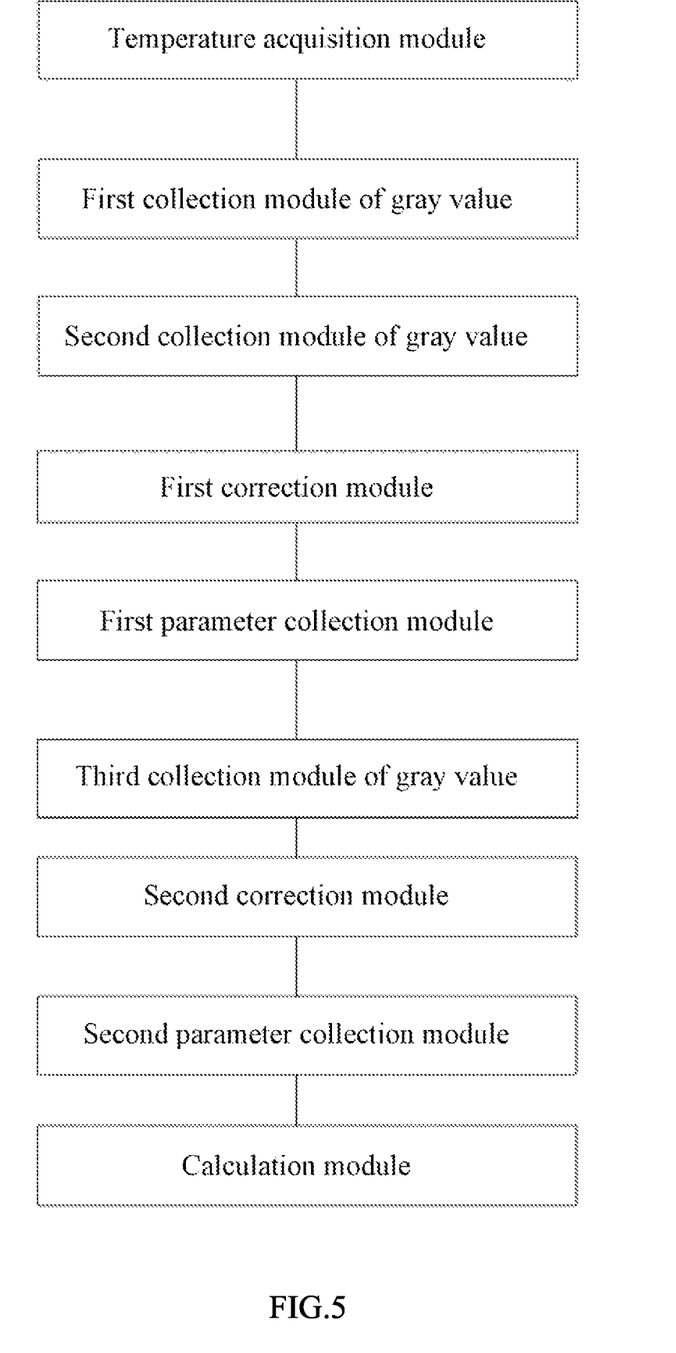
FIG. 5 is a module structure diagram of the system of two-point correction based on temperature substitution according to the present disclosure.

FIG. 5 is a flowchart of the method of two-point correction based on temperature substitution. As shown in FIG. 5, the present disclosure also provides a system of two-point correction based on temperature substitution, including:

A temperature acquisition module, used for acquiring a lens temperature for an infrared thermal camera in the thermal equilibrium state;

A first collection module of gray value, used for acquiring a gray value of a baffle arranged between a lens of the infrared thermal camera and a detector of the infrared thermal camera;

A second collection module of gray value, used for acquiring a gray value of a baffle arranged between the lens of the infrared thermal camera and the detector of the infrared thermal camera;

A first correction module, used for correcting the gray value of the first black body according to a first two-point correction parameter to obtain a corrected first uniform gray value, and for correcting the gray value of the baffle according to the first two-point correction parameter to obtain a corrected second uniform gray value;

A first parameter collection module, used for acquiring a first correction parameter according to the gray value of the first black body, the first uniform gray value, the gray value of the baffle and the second uniform gray value;

A third gray value collection module, used for acquiring a gray value of a second black body arranged in front of the lens of the infrared thermal camera; and a value by which a temperature of the second black body is higher than the lens temperature is a pre-set temperature value;

A second correction module, used for correcting the gray value of the second black body according to a second two-point correction parameter to obtain a corrected third uniform gray value;

A second parameter collection module, used for acquiring a second correction parameter according to the gray value of the first black body, the first uniform gray value, the gray value of the second black body, and the third uniform gray value;

A calculation module, used for correcting a gray value to be corrected according to the first correction parameter, the second correction parameter, the first uniform gray value and the second uniform gray value to obtain a corrected gray value.

Preferably, the first correction module is specifically expressed as:

$$\begin{cases} Y_{X1} = a_1 \cdot X_1 + b_1 \\ Y_B = a_1 \cdot B + b_1 \end{cases}$$

Wherein, $X_1$ is the gray value of the first black body, B is the gray value of the baffle, $Y_{X1}$ is the first uniform gray value, $Y_B$ is the second uniform gray value, $a_1$ is the first correction parameter, and $b_1$ is the first correction parameter quantity.

The present disclosure is beneficial in:

(1) On an infrared machine core with a baffle, in a classical two-point correction formula Y=YX−YB=a(X−B), a is not completely applicable to X and B. The present disclosure solves the problem that the correction parameter $a_1$ is not completely applicable to the target and baffle, and greatly eliminates the pot lid phenomenon caused by non-uniformity, thereby mitigating the image quality deterioration easily caused by the temperature change, broadening the application of the machine core system, and improving the image quality.

(2) In the new two-point correction formula Y=$a_2$·(X−$X_1$), $X_1$ is obtained by defocusing the imaging state by adjusting the lens, or by arranging a black body related to the lens temperature outside the lens and collecting its data. Such a $X_1$ is applicable both to $a_1$ and to $a_2$.

In this specification, various embodiments are described in a progressive manner, with each embodiment focusing on its differences from other embodiments, while cross reference would be enough for those same or similar parts between the embodiments. As the system disclosed in the embodiment corresponds to the method disclosed in the embodiment, the description is relatively simple, and the correlated parts can be found in the method description.

Principles and implementation of this present disclosure are described by specific examples, and the explanation of the above embodiments is only used to help understand the method and its core idea of the present disclosure. Also, those of ordinary skills in the art may take some modifications in the specific implementation and application scope according to the idea of the present disclosure. To sum up, the content of this specification should not be construed as limiting the present disclosure.

What is claimed is:

1. A method of two-point correction based on temperature substitution, comprising:

acquiring a lens temperature of an infrared thermal camera in the thermal equilibrium state;

acquiring a gray value of a first black body arranged in front of a lens of the infrared thermal camera; a temperature of the first black body being equal to a temperature of the lens;

acquiring a gray value of a baffle; the baffle being arranged between the lens of the infrared thermal camera and a detector of the infrared thermal camera;

correcting the gray value of the first black body according to a first two-point correction parameter to obtain a corrected first uniform gray value;

correcting the gray value of the baffle according to the first two-point correction parameter to obtain a corrected second uniform gray value;

acquiring a first correction parameter according to the gray value of the first black body;

the first uniform gray value; the gray value of the baffle and the second uniform gray value;

acquiring a gray value of a second black body arranged in front of the lens of the infrared thermal camera; the second black body having a temperature that is higher than the lens temperature by a pre-set temperature value;

correcting the gray value of the second black body according to a second two-point correction parameter to obtain a corrected third uniform gray value;

acquiring a second correction parameter according to the gray value of the first black body;

the first uniform gray value; the gray value of the second black body; and the third uniform gray value; and correcting a gray value to be corrected according to the first correction parameter;

the second correction parameter; the first uniform gray value and the second uniform gray value to obtain a corrected gray value.

2. The method of two-point correction based on temperature substitution according to claim 1; further comprising; before obtaining the lens temperature of the infrared thermal camera in the thermal equilibrium state:

heating the core of the infrared thermal camera for a pre-set time period; to cause the infrared thermal camera to achieve a thermal equilibrium state.

3. The method of two-point correction based on temperature substitution according to claim 1; wherein the gray value of the first black body is corrected according to the first two-point correction parameter to obtain the corrected first uniform gray value; and the gray value of the baffle is corrected to obtain the corrected second uniform gray value; which is specifically expressed as:

$$\begin{cases} Y_{X1} = a_1 \cdot X_1 + b_1 \\ Y_B = a_1 \cdot B + b_1 \end{cases}$$

wherein; $X_1$ is the gray value of the first black body; B is the gray value of the baffle; $Y_{X1}$ is the first uniform gray value; $Y_B$ is the second uniform gray value; a1 is the first correction parameter;

and b1 is the first correction parameter quantity.

4. The method of two-point correction based on temperature substitution according to claim 1; wherein the first correction parameter is acquired according to the gray value of the first black body; the first uniform gray value; the gray value of the baffle and the second uniform gray value; which is specifically expressed as:

$$a_1 = (Y_B - Y_{X1})/(B - X_1)$$

wherein; $a_1$ is the first correction parameter; $X_1$ is the gray value of the first black body; B is the gray value of the baffle; $Y_{X1}$ is the first uniform gray value; $Y_B$ is the second uniform gray value.

5. The method of two-point correction based on temperature substitution according to claim 1; wherein the gray value of the second black body is corrected according to the second two-point correction parameter to obtain the corrected third uniform gray value;

which is specifically expressed as:

$$Y_{X2} = a_2 \cdot X_2 + b_2$$

wherein; $a_2$ is the second correction parameter; $X_2$ is the gray value of the second black body; $Y_{X2}$ is the third uniform gray value; and $b_2$ is the second correction parameter quantity.

6. The method of two-point correction based on temperature substitution according to claim 1; wherein the second correction parameter is acquired according to the gray value of the first black body; the first uniform gray value; the gray value of the second black body; and the third uniform gray value; which is specifically expressed as:

$$a_1 = (Y_B - Y_{X1})/(B - X_1)$$

wherein $a_2$ the second correction parameter; $X_1$ is the first uniform gray value;

$X_1$ is the gray value of the first black body; $X_2$ is the gray value of the second black body; and $Y_{X2}$ is the third uniform gray value.

7. The method of two-point correction based on temperature substitution according to claim 1; wherein the gray value to be corrected is corrected according to the first correction parameter; the second correction parameter; the first uniform gray value and the second uniform gray value to obtain the corrected gray value; which is specifically expressed as:

$$Y_{X2} = a_2 \cdot X_2 + b_2$$

wherein, $X_1$ is a difference value between the corrected second uniform gray value and the corrected first uniform gray value, $Y_{X1}$ is the corrected first uniform gray value, $Y_B$ is the corrected second uniform gray value, ads the first correction parameter, $a_2$ is the second correction parameter, B is the gray value of the baffle, X is the gray value to be corrected, and Y is the corrected gray value.

8. The method of two-point correction based on temperature substitution according to claim 7; wherein a calculation method of the difference value comprises:

obtaining a current lens temperature and a current baffle temperature; and calculating a difference value according to $Y_B - Y_{X1} = F(T_J - T_B)$ a formula by using a pre-stored fitting function; wherein TJ is the current lens temperature; TB is the current baffle temperature;

and F is the fitting function;

wherein the fitting function is determined by:

during the process of heating the infrared thermal camera; collecting fitting data many times; the fitting data including the gray value of the baffle; the gray value of the first black body; the lens temperature and the baffle temperature; and performing a fitting process according to a plurality of groups of fitting data to obtain a fitting function.

\* \* \* \* \*